(12) United States Patent
Huffman et al.

(10) Patent No.: US 11,474,193 B2
(45) Date of Patent: Oct. 18, 2022

(54) CAMERA CALIBRATION FOR LOCALIZATION

(71) Applicant: HERE Global B.V., Eindhoven (NL)

(72) Inventors: Landis Huffman, Chicago, IL (US); Joshua Michael Finken, Park City, UT (US); Amey Aroskar, North Aurora, IL (US); Sumedh Rasal, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/116,771

(22) Filed: Dec. 9, 2020

(65) Prior Publication Data

US 2022/0179038 A1    Jun. 9, 2022

(51) Int. Cl.
*G01S 5/16* (2006.01)
*H04N 5/232* (2006.01)
*G01C 21/20* (2006.01)

(52) U.S. Cl.
CPC .......... *G01S 5/16* (2013.01); *H04N 5/23222* (2013.01); *H04N 5/232939* (2018.08); *G01C 21/20* (2013.01)

(58) Field of Classification Search
CPC . G01S 5/16; H04N 5/23222; H04N 5/232939
See application file for complete search history.

(56) References Cited

U.S. PATENT DOCUMENTS

| | | | |
|---|---|---|---|
| 8,509,488 B1 * | 8/2013 | Enge | G01C 21/3623 701/55 |
| 9,201,424 B1 | 12/2015 | Ogale | |
| 2013/0212094 A1 | 8/2013 | Naguib et al. | |
| 2015/0149084 A1 * | 5/2015 | Lai | G01S 19/48 701/468 |
| 2016/0012588 A1 | 1/2016 | Taguchi | |
| 2020/0372672 A1 | 11/2020 | Schonberger et al. | |

FOREIGN PATENT DOCUMENTS

CN   103994779 A   8/2014
CN   110619666 A   12/2019

OTHER PUBLICATIONS

Stein, Gideon P. "Accurate Internal Camera Calibration Using Rotation, with Analysis of Sources of Error." Proceedings of IEEE International Conference on Computer Vision. IEEE, 1995. (pp. 1-7).
Wu, Teng, et al. "Accurate Smartphone Indoor Visual Positioning Based on a High-Precision 3D Photorealistic Map" Sensors 2018. Jun. 20, 2018. (pp. 1-21).
European Patent Application No. 21213377.1, Search Report dated, May 18, 2022 (10 pages).

* cited by examiner

*Primary Examiner* — Ahmed A Berhan
(74) *Attorney, Agent, or Firm* — Lempia Summerfield Katz LLC

(57) ABSTRACT

An apparatus and/or method includes localization of a mobile device. The localization technique is calibrated by prompting the mobile device for a collection of static position images for an image-based localization service, sending static position images to the image-based localization service, receiving, for the static position images, a plurality of localization values from the image-based localization service, calculating a correction for the plurality of localization values, and providing a location for the mobile device based on the correction for the plurality of localization values.

20 Claims, 16 Drawing Sheets

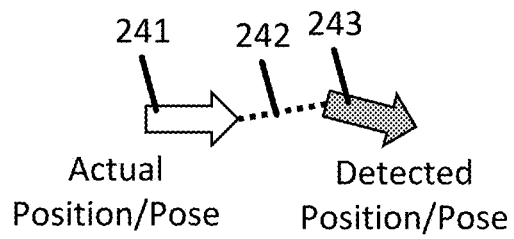
FIG. 4A
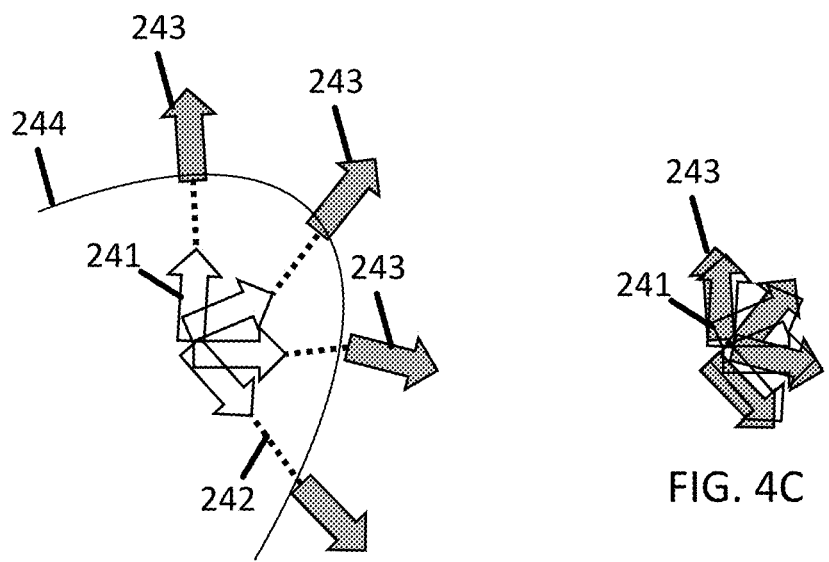
FIG. 4B
FIG. 4C
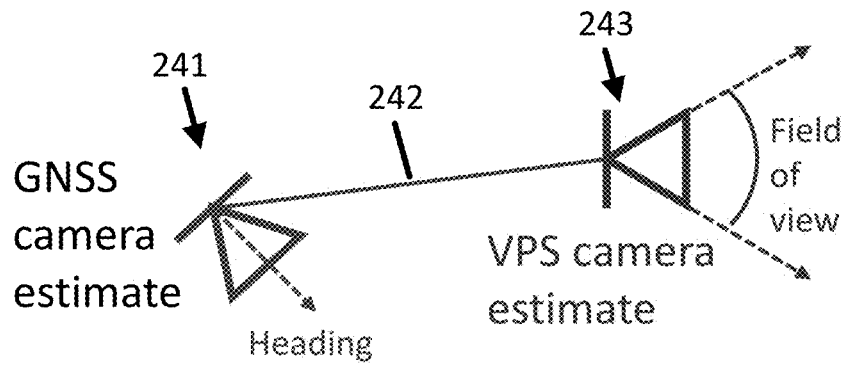
FIG. 4D

CAMERA CALIBRATION FOR LOCALIZATION

FIELD

The following disclosure relates to the calibration of an image-based visual positioning system, or the alternative, a real-time camera calibration for use in the image-based visual positioning system.

BACKGROUND

The Global Positioning System (GPS) or another global navigation satellite system (GNSS) provides location information to a receiving device anywhere on Earth as long as the device has a substantial line of sight without significant obstruction to three or four satellites of the system. The GPS system is maintained and made available by the United States government. Originally, the government retained exclusive use of GPS. Over time increasing levels of accuracy of the GPS signals were made available to the public.

Accuracy of the GPS system alone is about 50 feet or 15 meters. The accuracy may be augmented using secondary techniques or systems such as the Wide Area Augmentation System (WAAS), Differential GPS (DGPS), inertial navigation systems (INS) and Assisted GPS. WAAS and DGPS improve accuracy using ground stations that transmit position information. INS utilizes internal sensors at the receiving device for improving the accuracy of GPS.

However, some applications require greater accuracies obtainable with GPS, even with enhanced accuracy techniques. For example, in high definition mapping and navigating application, the receiving device may be placed on a map in a three-dimensional view with greater accuracy than that obtainable from GPS techniques. Localization techniques that match a location to a map or environment face additional challenging in improving this accuracy.

SUMMARY

In one embodiment, a method for localization of a mobile device includes prompting the mobile device for a collection of static position images for an image-based localization service, sending static position images to the image-based localization service, receiving, for the static position images, a plurality of localization values from the image-based localization service, calculating a correction for the plurality of localization values, and providing a location for the mobile device based on the correction for the plurality of localization values.

In one embodiment, an apparatus for calibration of a localization technique includes a camera, a controller, and a user interface. The camera is configured to collect an initial set of images for localization with a visual positioning service. The controller is configured to identify an error in initial localization data received from the visual positioning service. The user interface configured to prompt collection of static position images for the visual positioning service in response to the error, and the controller is configured to determine a correction for a plurality of localization values received from the visual positioning service based on the static position images.

In one implementation, a non-transitory computer readable medium including instructions that when executed are configured to perform calculating a first set of localization data based on an initial set of images received from a mobile device, providing the first set of localization data to the mobile device, receiving a calibration request and a subsequent set of images from the mobile device, calculating a calibration factor based on the subsequent set of images, calculating a second set of localization data based on the subsequent set of images received from the mobile device and the calibration factor, and providing the second set of localization data to the mobile device.

BRIEF DESCRIPTIONS OF THE DRAWINGS

Exemplary embodiments of the present invention are described herein with reference to the following drawings.

FIGS. 4A-4D illustrate example illustrations of an error in the localization system of FIG. 2.

DETAILED DESCRIPTION

Figure 1:
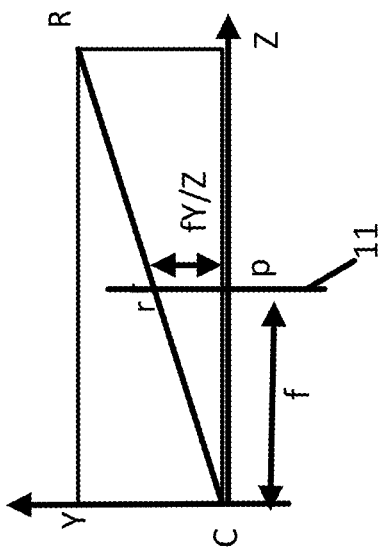
FIG. 1 illustrates an example pinhole camera model.
Figure 1:
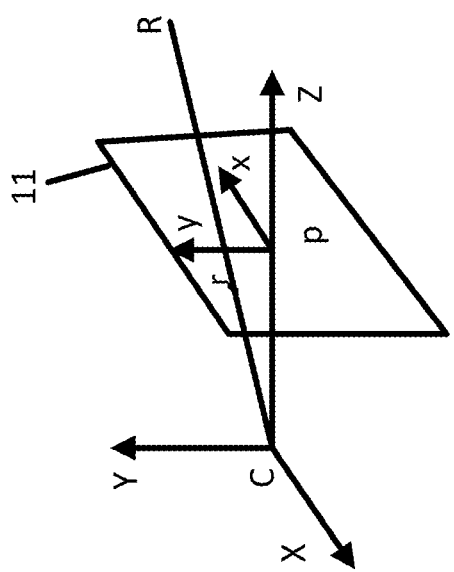

Localization is the is a term that encompasses various techniques for calculating the position and orientation of a user device or associated device. GNSS is one example but has shortfalls. For example, GNSS relies on the timing of radio signals from satellites and the radio signal may be affected by reflections from buildings or other objects on the transmission to the user or associated device. Various systems have been developed for localization as an alternative to GNSS or to supplement GNSS.

A visual positioning service (VPS), or another example image-based localization service, includes an automated algorithm for estimating the position and orientation, which may be referred to as the pose, of a mobile device using an image, which may be captured from a camera of the mobile device. VPS provides an alternative to GNSS, providing accurate position estimates in GNSS-constrained areas such as indoors or dense urban canyons. Even when reliable GNSS is available, VPS can augment GNSS for more accurate positioning. Furthermore, VPS provides an estimate for camera orientation, which GNSS cannot. At least one of the following embodiments include a VPS system that can estimate position with sub-meter accuracy (e.g., accuracy to 10-80 cm) with near-real-time processing (e.g., real time with or without a nominal delay such as 1-100 milliseconds). The estimated position improves a variety of technologies including collision avoidance and other driving assistance systems and autonomous vehicles.

Another technology improved by the following embodiments is augmented reality (AR). AR applications for navigation may be improved by aligning the camera imagery to the real world. AR and VPS may transform how consumers utilize navigation. Users may experience AR on their mobile screen as overlays of route information, displays of nearby restaurants and POIs, and three-dimensional (3D) scene models could allow the user to see objects through walls.

In some examples, VPS estimates a camera pose by comparing point features extracted from a query image to those in a reference 3D point cloud model of the scene. The 3D point cloud is a visual representation of the scene built from many source images. It is comprised of a dense set of 3D point coordinates, where each point also stores a visual descriptor that encodes the photographed appearance of that point in one or more of the source images.

However, VPS estimates may be susceptible to one or more camera settings that are not configurable, or even detectable, by VPS. Consider the pinhole camera model 10 of FIG. 1 used to translate between a 3D point cloud and an image plane. In the pinhole camera model 10 a camera is located at camera center C in X-Y-Z space and collects an image of an object R. The image is represented by an image plane 11 where image r represents the object R. The pinhole camera model 10 can be parametrized by the focal length, of the camera, which is the distance, f, from the camera center C to the image plane. The focal length f may be the distance from the camera center C to the principal point p of the image plane 11. The height of the image r for object R may be related to the focal point such that the height h is the focal point f multiplied by the ratio of the vertical distance Y to the object R to the horizontal depth Z to the object R ($h=f*Y/Z$).

The focal length determines the zoom level of the camera lens, where larger focal lengths indicate a higher zoom level. The focal length is critical in calculating the geometric triangulation of corresponding 2D pixels and matched 3D points which then determines the estimated camera pose. The estimation of camera position is crucially dependent on an accurate quantitative model for the camera that captured the query image. If the focal length is improperly measured or estimated, then the pose estimated by VPS may be less accurate.

Empirically, it has been shown that the position of a mobile device (e.g., smart phone) is determined using VPS may not be accurate. For example, inaccuracies have been demonstrated when the VPS results have been compared to position obtained by a highly accurate positioning device (e.g., an attached real-time kinematic (RTK) device capturing GNSS position measurements). Similar errors may be demonstrated by employing VPS at a location known to the user by visual inspection, such as a particular corner of an intersection of two roads.

The following embodiments correct for errors that occur in VPS. In some examples, VPS is performed at a server, and the errors are identified and/or corrected at the server. In other words, the images collected by the mobile device are compared to a reference point cloud at the server and subsequently one or more errors are corrected so that the images, or new images, collected by the mobile device are compared to the reference point cloud at the server. In some examples, VPS is performed locally at the mobile device, and the errors are identified and/or corrected at the mobile device. In other words, the images collected by the mobile device are compared to a reference point cloud at the mobile device and subsequently one or more errors are corrected so that the images, or new images, collected by the mobile device are compared to the reference point cloud at the mobile device.

In some examples, VPS is performed at the server, but the errors are identified at the mobile device, and subsequently, errors are reported to the server for correction. In other words, the images collected by the mobile device are compared to a reference point cloud at the server and subsequently one or more errors are identified by the mobile device so that the images, or new images, collected by the mobile device are sent with calibration information to the server so that the initial images, or subsequent images, are compared to the reference point cloud at the server in light of the calibration information. In some examples, VPS is performed at the server, but the errors are identified at the mobile device, and subsequently, errors are corrected at the mobile device. In other words, the images collected by the mobile device are compared to a reference point cloud at the server to provide a location to the mobile device, and subsequently one or more errors are corrected by the mobile device by modifying the location previously reported based on calibration information.

The identification and correction of these errors improve the technology of VPS or any type of localization based on images and/or calculations using the focal length of the camera model.

The following embodiments also relate to several technological fields including but not limited to navigation, autonomous driving, assisted driving, traffic applications, and other location-based systems. The following embodiments achieve advantages in each of these technologies because improved localization improves the accuracy of each of these technologies. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in accuracy and speed.

Figure 2:
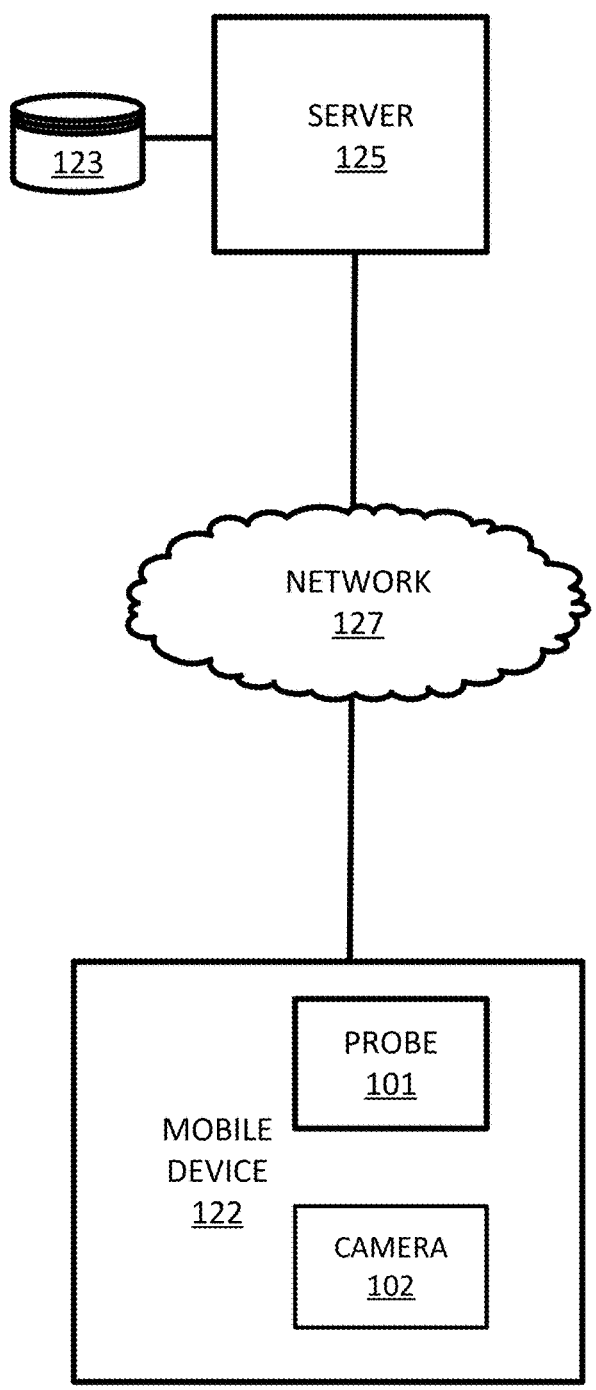
FIG. 2 illustrates an example system for calibration of a localization system or a camera for use therein.

FIG. 2 illustrates an example system for calibration of a localization service or a camera for use therein. Additional, different, or fewer components may be included in the system. The following embodiments may be entirely or substantially performed at the server 125, or the following embodiments may be entirely or substantially performed at the mobile device 122. In some examples, some aspects are performed at the mobile device 122 and other aspects are performed at the server 125.

The mobile device 122 may include a probe 101 or position circuitry such as one or more processors or circuits for generating probe data. The probe points are based on sequences of sensor measurements of the probe devices collected in the geographic region. The probe data may be generated by receiving GNSS signals and comparing the GNSS signals to a clock to determine the absolute or relative position of the mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as the probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, every 100 milliseconds, or another interval). In this case, there are additional fields like speed and heading based on the movement (i.e., the probe reports location information when the probe 101 moves a threshold distance). The predetermined time interval for generating the probe data may be specified by an application or by the user. The interval for providing the probe data from the mobile device 122 to the server 125 may be the same or different than the interval for collecting the probe data. The interval may be specified by an application or by the user.

Communication between the mobile device 122 and the server 125 through the network 127 may use a variety of types of wireless networks. Some of the wireless networks may include radio frequency communication. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handyphone system (PHS), and 4G or long term evolution (LTE) standards, 5G, DSRC (dedicated short range communication), or another protocol.

The following embodiments correct for errors that occur in image-based localization. In image-based localization a position of the mobile device 122 is determined based on one or more images collected by the camera 102. The image-based localization may be performed at the mobile device 122 or at the server. As described in more detail below, the image-based localization is calibrated to correct one or more camera parameters, which improves the accuracy of the calculated position of the mobile device 122. The calibration and correction may occur at the mobile device 122 or at the server 125. In a hybrid implementation, the correction may be determined at the mobile device 122 and the calibration applied at the server 125.

Figure 3:
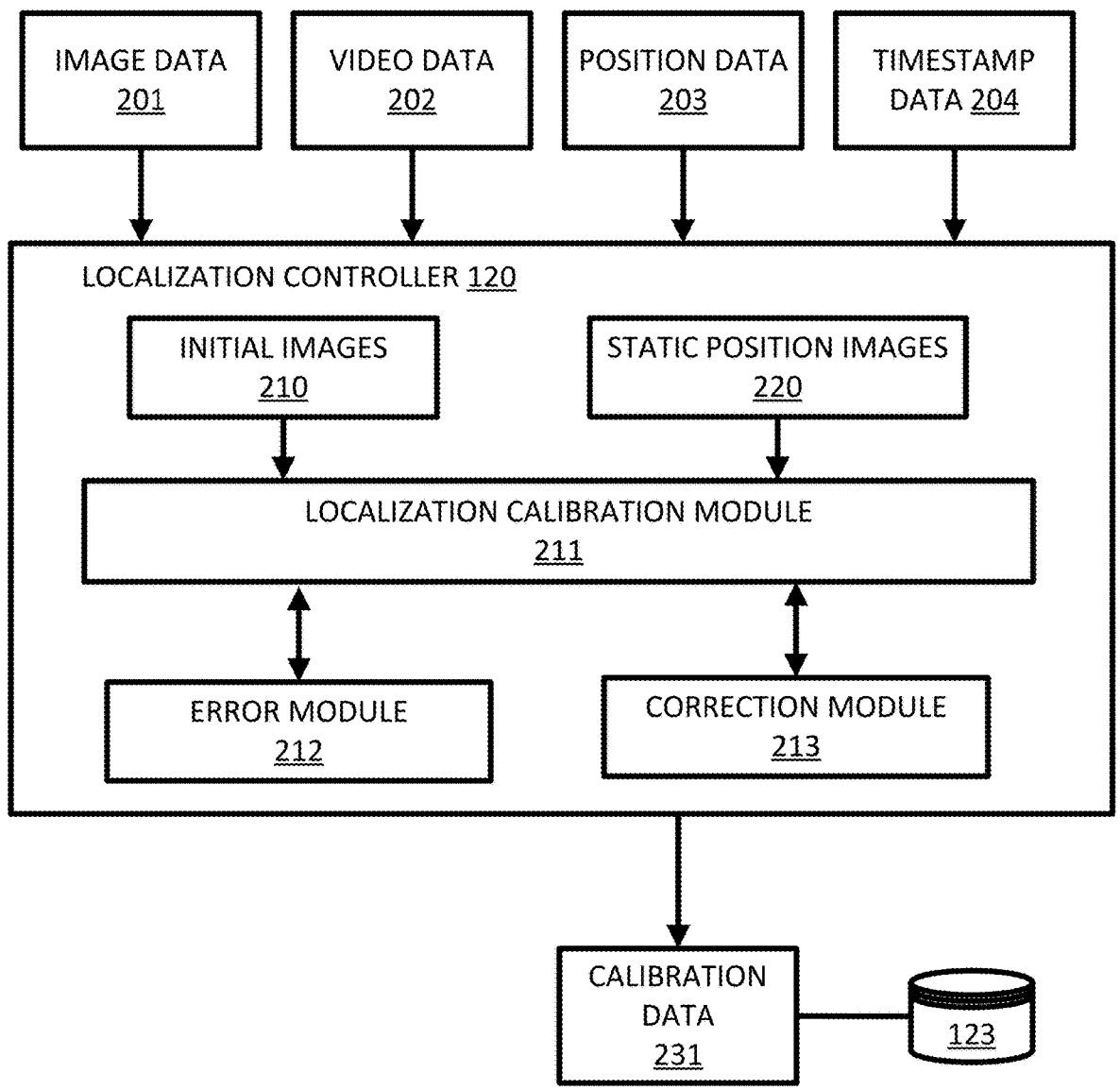
FIG. 3 illustrates an embodiment of a controller for the system of FIG. 2.

FIG. 3 illustrates an embodiment of a localization controller 120 for the system of FIG. 2. The localization controller 120 may be implemented by either or both of the mobile device 122 and server 125. Additional, different, or fewer components may be included. The localization controller 120 may include a localization calibration module 211, an error module 212, and a correction module 213. The localization calibration module 211 may analyze a set of initial images 210 and/or a set of static position images 220, as described in various embodiments below. Other computer architecture arrangements for the localization controller 120 may be used.

The localization controller 120 receives data from one or more sources. The data sources may include image data 201, video data 202, position data 203, and timestamp data 204. The image data 201 may include a set of images collected by the mobile device 122, for example by camera 102. Likewise, the video data 202 may include a series of images in a video collected by the mobile device 122, for example by camera 102. The image data 201 and/or video data 202 may be collected by a camera coupled to a vehicle and/or associated with the mobile device 122.

The image data 201 and/or video data 202 may be user selected data. That is, the user of the mobile device 122 may select when and where to collect the image data 201 and/or video data 202. For example, the user may collect image data 201 and/or video data 202 for the purpose of personal photographs or movies. Alternatively, the user may be prompted to collect the image data 201 and/or video data 202.

The image data 201 and/or video data 202 may be collected from vehicles. For example, a vehicle may include a camera that collects images of the surrounding area. The images may be collected for the purpose of detecting objects in the vicinity of the vehicle, determining the position of the vehicle, or providing automated driving or assisted driving.

In any of these examples, the images may be collected based on geocodes associates with the images. For example, a vehicle manufacturer, an individual user of the mobile device 122, or an application administrator, may index or store images according to geocodes describing the geographical location from where the images were collected. The geocode may include geographic coordinates (e.g., latitude and longitude). The geocodes may include country, regional, or local identifiers for the location. The geocodes are one example of position data 203. However, the position data 203 may include any type of position information and may be determined by the mobile device 122 and stored by the mobile device 122 in response to collection of the image data 201. The position data 203 may include geographic coordinates and at least one angle that describes the viewing angle for the associated image data. The at least one angle may be calculated or derived from the position information and/or the relative size of objects in the image as compared to other images.

The timestamp data 204 may be stored along with or otherwise associated with image data 201 and/or video data 202. The timestamp data 204 may include data indicative of a specific time (e.g., year, month, day, hour, minute, second, etc.) that the image data 201 and/or video data 202 were collected by the mobile device 122 or another device.

The initial images 210 provided to the localization controller 120 includes information from one or more of these data sources. The initial images 210 may be in combination with any of image data 201, video data 202, position data 203, and timestamp data 204. For example, the initial images 210 may include two-dimensional images collected by the mobile device 122 and associated with position information and timestamp information. In some examples, the calibration techniques are applied to a stream of images as they are received in the image data 201 and/or video data 202 continuously (e.g., in real time or near real time). In other examples, the initial images 210 are tested to determine whether any error exists in order to trigger the calibration techniques.

FIGS. 4A-4D illustrate example illustrations of an error in the localization system of FIG. 2. As described above, the camera 102 may report one or more camera properties to the localization controller 120. The camera property may be focal length or zoom level. Using the camera property and the image data itself, the localization controller 120 performs the localization process for the initial images 210. The results of this localization process may be illustrated as VPS camera estimate 243 in FIGS. 4A-4D (other positioning techniques other than VPS may be used). It can be demonstrated that errors are present in the VPS camera estimate 243 for position and pose. In one example, a GNSS positioning system (e.g., position data 203) having sufficiently high accuracy may return an actual position 241 for position and pose. The actual position 241 in this example is illustrative and need not be detected. Rather, the example of FIG. 4A illustrates that there is a discrepancy between the actual position 241 and the estimate 243 based on a localization technique relying on one or more camera properties. The difference is shown by dotted line 242.

The differences between the estimated position 243 and the actual position 241 are further evident when images for localization are collected from a single geographic position (e.g., by change pose or view angle). FIGS. 4B and 4C illustrates a set of estimated positions 243 and a set of actual positions 241. Images are collected from the same geographic position with a viewing angle or heading that is changed. From these images, the corresponding estimated positions 243 are calculated. As shown in FIG. 4B, the estimated positions 243 may be spaced apart in error. The differences, illustrated by dotted lines 242, may depend on incorrect assumptions made in localization calculations and related to one or more camera properties. FIG. 4B further illustrates that the error is generally constant in magnitude but changes in direction according to pose.

This is consistent with an incorrect zoom level or focal length used in the localization technique. Referring to the camera model of FIG. 1, if the localization technique uses an incorrect focal length or zoom level, it will place the camera in the wrong location. If the localization technique uses a lower zoom level or greater focal length in the calculations as compared to what is actually being used in the collection of the images, the localization technique will place camera position C further forward (toward the image plane) in order to emulate the true zoom. Thus, there will error 242 in the direction of the camera or pose, for each angle that the images were collected. To correct error 242 in this direction, the focal length should be increased.

Likewise, if the localization technique uses a higher zoom level or lower focal length in the calculations as compared to what is actually being used in the collection of the images, the localization technique will place camera position C behind (farther away from the image plane) the user, in order to emulate the zoom. To correct error 242 in this direction, the focal length should be decreased.

Thus, there will error illustrated by line 242 in the direction of the camera or pose, for each angle that the images were collected. If images are collected as the user or mobile device rotates without changing position, the result will approximate a circle or semi-circular shape, as shown by line 244. FIG. 4C illustrates results of an example corrected localization process when the error 242 is corrected by adjusting the focal length that is reported with the images that were collected.

FIG. 4D illustrates example symbols for the actual position 241 and estimated position 243. The symbols are used in the aerial images of FIGS. 5 and 9. The comparison to GNSS may only be a demonstration that error is present. GNSS may not be used to determine the error.

Figure 5A:
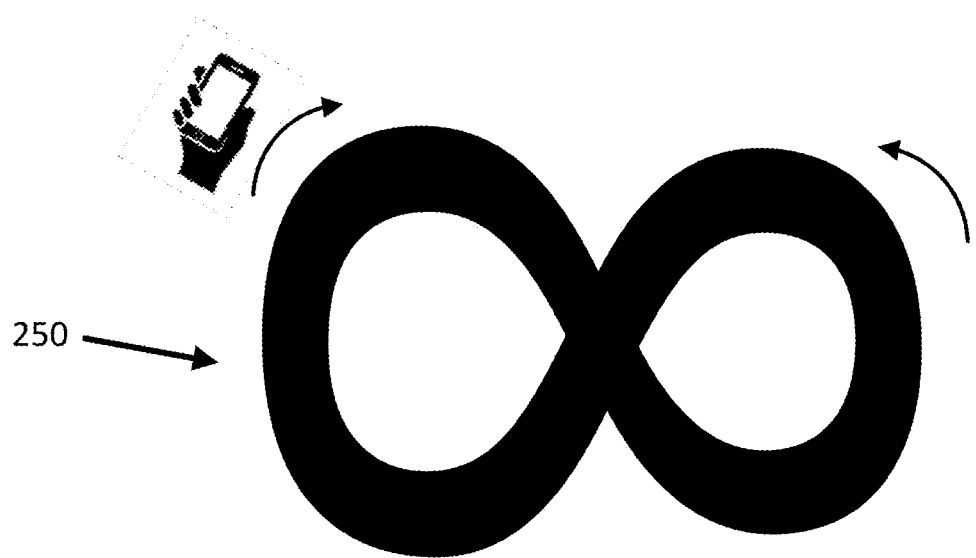
FIG. 5A illustrates an example pose calibration indicator.

FIG. 5A illustrates an example calibration indicator 250. Before the error can be estimated by the error module 212 or the calibration amount can be calculated by correction module 213, the localization calibration module 211 may determine that the camera properties are updated and/or as accurate as possible. The localization calibration module 211 may generate a provide a calibration indicator 250. The calibration indicator 250 may instruct the user to move the mobile device 122 to a predetermined orientation or to move the mobile device 122 in a particular path or pattern. The calibration indicator 250 in FIG. 5A illustrates a FIG. 8 shape. Using the known path and/or orientation the localization calibration module 211 may re-calculate one or more of the camera properties for the camera 102. One particular property may be the heading or pose of the mobile device.

Figure 5B:
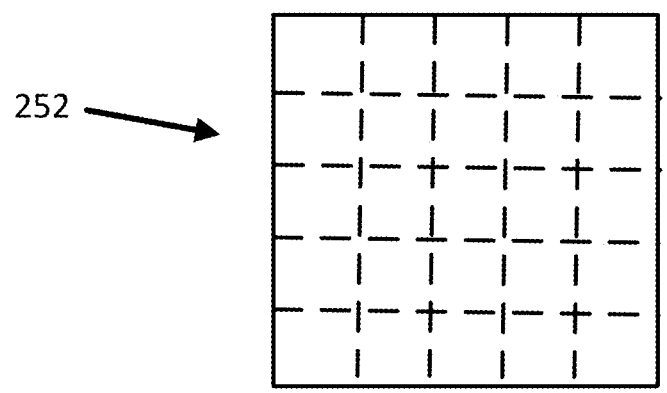
FIG. 5B illustrates an example zoom calibration indicator.

FIG. 5B illustrates another example calibration indicator 252 for initializing the focal length or zoom setting of the camera 102. The calibration indicator 252 may be a checkerboard pattern or another pattern of predetermined and known form, dimensions, and shape. The user may be instructed to collect one or more images of the calibration indicator 252. Using the relative spaces and angles of the calibration indicator 252, the localization calibration module 211 may calculate one or more of the camera properties for the camera 102. One particular property may be the zoom setting or focal length of the camera 102. The camera property initially set by calibration indicator 252 may be adjusted by the calibration techniques herein.

Figure 6:
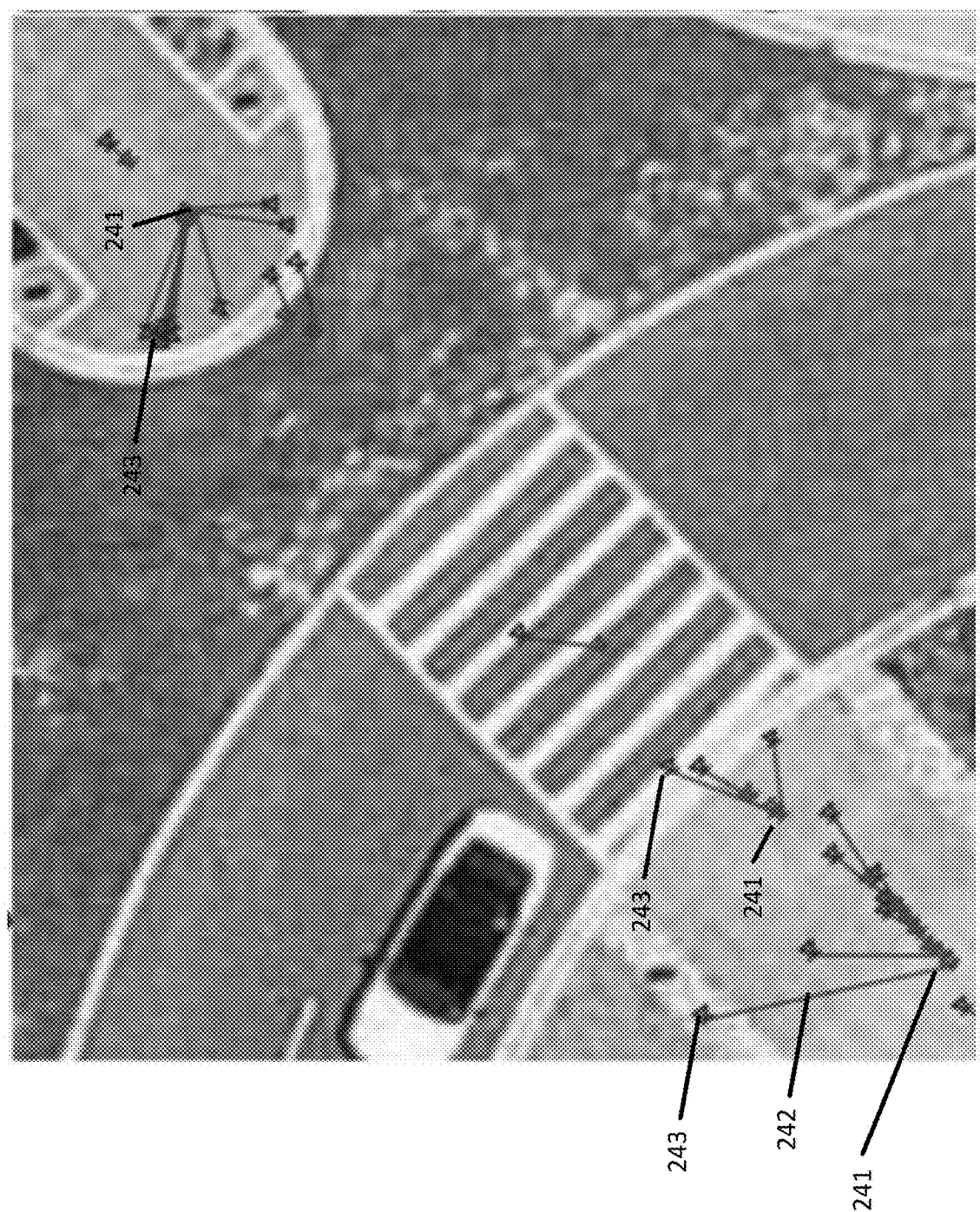
FIG. 6 illustrates an example illustration of the error overlaid on a map or aerial image.

FIG. 6 illustrates an example illustration of the error overlaid on a map or aerial image. The aerial image itself is not used in the localization or the calibration and correction techniques described herein. The aerial image provides context of example simultaneous position estimates obtained by a VPS system (estimated positions 243) and a high accuracy GNSS (actual positions 241) of a pedestrian walking across a crosswalk, then standing in a fixed position and panning the camera 102 of the mobile device. The estimated positions 243 and the actual positions 241 may be matched according to timestamp data 204. Each of the estimated positions 243 may be pared with an actual position 241 based on time.

The error line 242 that connects each pair of estimated position 243 and actual position 241 represents the difference between the estimated position 243 and actual position 241 that should be corrected. When the error line 242 is longer, the error is greater. As an example, the error line 242 in FIG. 5 was generated with estimated positions 243 generated by the localization system of VPS with a setting of 4.3 mm for the focal length. This focal length may be automatically reported by the application programming interface (API) of the mobile device 122 and associated with images collected by the camera 102, including the initial images 210.

In practice the error module 212 may identify and/or calculate the error without the existence of GNSS (e.g., position data 203) as represented by the actual positions 241. In one example, the error is estimated by the error module 212, and when the error estimate exceeds a threshold the calibration technique is started.

In either case, with or without GNSS, the error module 212 may receive at least two positions (e.g., estimated position 243 and actual position 241) for the mobile device 122 in the initial localization data. The error module 212 may compare at least two positions for the mobile device 122 in order to calculate the error in the initial localization data is based on the comparison.

The error module 212 may compare the error, or the difference between the at least two positions (e.g., estimated position 243 and actual position 241) for the mobile device 122. The error module 212 may compare the difference between the at least two positions to a threshold. When the error exceeds the threshold, the calibration technique is triggered.

In other examples, the calibration technique is performed to determine the actual error, and then the correction is applied when the actual error exceeds the threshold, or is nonzero. The calibration technique may be triggered in a variety of ways. As described above, the error module 212 may monitor the localization position data for errors, and the calibration technique is triggered when a significant error is detected. Alternatively, the calibration technique may be performed at a predetermined time interval in response to changes in the timestamp data 204 (e.g., at certain times or when a set time has passed since the last calibration). The calibration technique may be performed at a geographic interval in response to changes in the position data 203 (e.g., when the position of the mobile device 122 changes by a threshold distance since the last calibration). The calibration technique may be performed in response to a user request. In any of these examples, the localization controller 120 may identify the trigger to initiate calibration technique and provide an instruction to the localization calibration module 211 to perform calibration.

In response to the calibration trigger, the localization calibration module 211 performs the calibration technique. The calibration technique may begin with an instruction or prompt to the mobile device 122 to collect the static position images 220. The static position images 220 are two or more images collected by the mobile device 122 at varying headings or poses but having the same or substantially the same geographic position. Substantially the same geographic position may mean exactly the same position, similar positions within the resolution of the position circuitry, or similar positions within a range (e.g., 1 foot, 1 meter). The static position images 220 may be collected by standing in one location and turning around in a circle, while remaining the same location.

Figure 7:
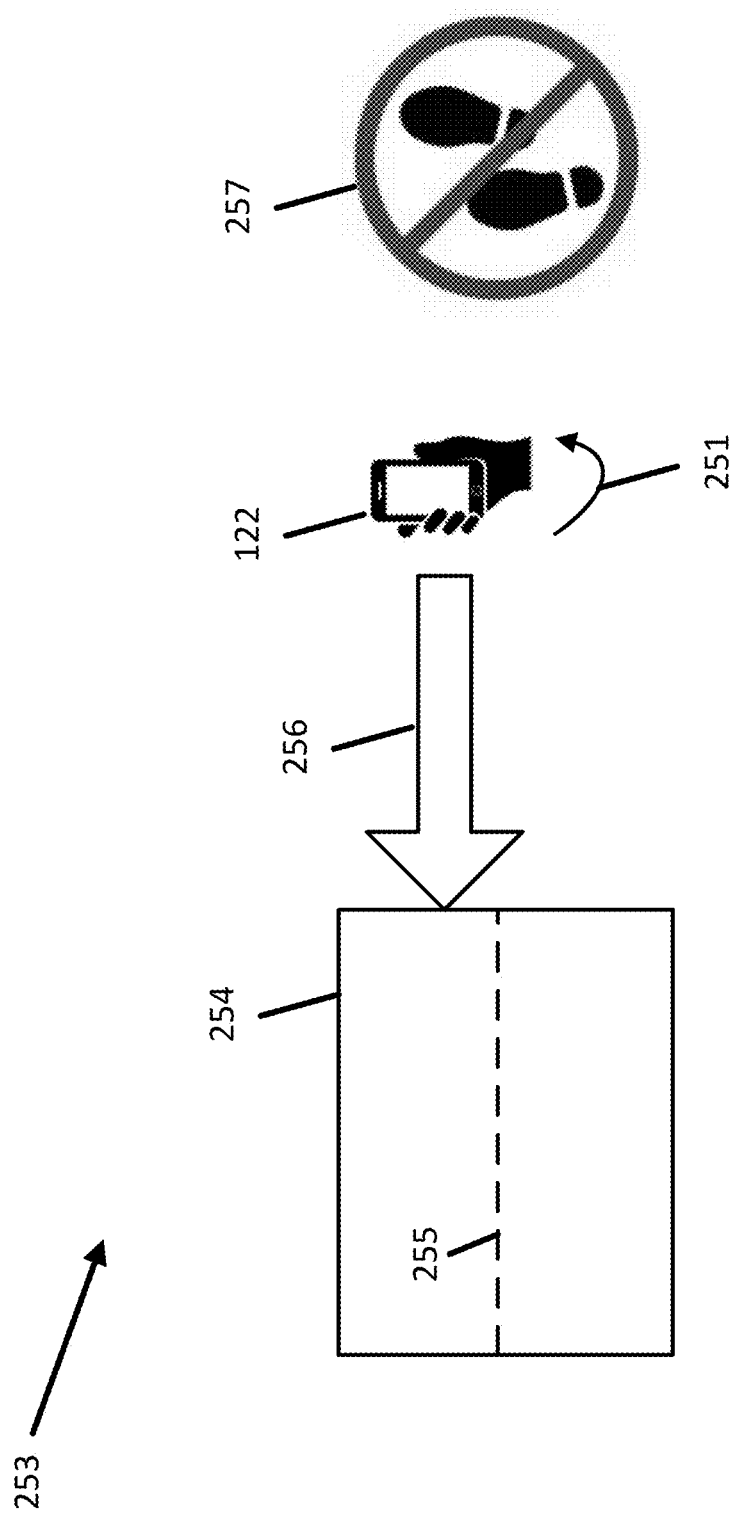
FIG. 7 illustrates an example image collection indicator.

FIG. 7 illustrates an example image collection indicator 253 that may be displayed at the mobile device 122 to instruct the user to collect the static position images 220. The image collection indicator 253 may include an instruction for the user to rotate and collect the static position images 220. The instruction may be textual (e.g., stand in one spot and rotate; pan the view of the camera like a panorama, etc.) or graphical such as arrow 251 as an instruction to pan the mobile device 122 for the collection of static position images 220.

The image collection indicator 253 may include a leveling indicator for the collection of the static position images 220. For example, view window 254 that includes a live stream of the images viewed by the camera 102. The view window 254 may include a reference line 255 that serves as a guide for the user. The static position images 220 should be collected at the same angle relative to ground. The reference line 255 is aligned with arrow 256 when the mobile device 122 is at the correct angle for collection of the static position images 220. The position of the reference line 255 may be set in agreement with the first image of the static position images 220 so that subsequent images will be aligned. As the pitch of the mobile device 122 changes (e.g., through natural variations in the user's hand), the arrow 256 may deviate from the reference line 255. The visual image collection indicator 253 allows the user to adjust and correct for these variations.

A reminder icon 257 may be simultaneously displayed to remind the user not to move while collecting the static position images 220. The reminder icon 257 is an instruction to remain stationary but other messages such as text stating "do not move position" may be used.

In another example, the localization controller 120 may display the reminder icon 257 at certain times. For example, the localization controller 120 may monitor the position data 203 and determine if the mobile device 122 moves a certain distance during the collection of the static position images 220. When the mobile device has moved more than the specified distance, the reminder icon 257 is displayed.

In other examples, the localization controller 120 may monitor the position data 203 and determine if the mobile device 122 moves a disqualification distance during the collection of the static position images 220. When the mobile device has moved more than the disqualification distance, the localization controller 120 may reset the static image collection process. Any already collected static position images 220 may be deleted.

The localization controller 120 receives the static position images 220 collected by the camera and generates a calibration factor in response to an analysis of the static position images.

Figure 8:
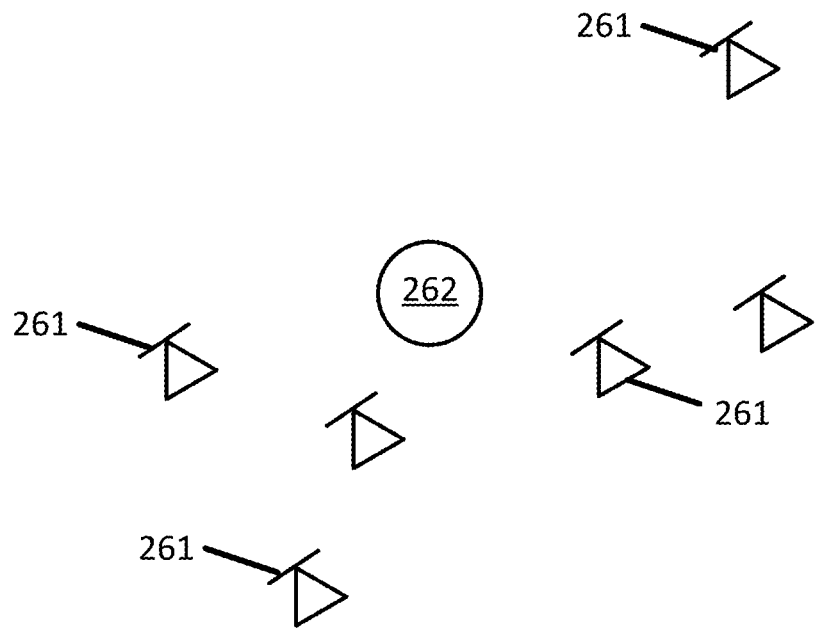
FIG. 8 illustrates an example calculation for calibration in the localization system or camera for use therein.

FIG. 8 illustrates an example calculation for calibration in the localization system or camera for use therein. The calculation for calibration utilizes position points 261 derived using the localization technique for the static position images 220. Each point of the position points 261 may be associated with one of the static position images 220.

The localization calibration module 211 may perform a geometric, arithmetic, or statistical operation on the points of the position points 261. In one example, the points may be averaged. For example, a centroid 262 of the position points 261 may be calculated by the localization calibration module 211. The centroid 262 may be determined by averaging the coordinates of the position points 261. Geometrically, the position points 261 may form a shape in a plane that has centroid 262. Statistically, one or more outliers may be removed from the position point 261 and the mean of the remaining points calculated.

Once the centroid 262 is determined, the localization calibration module 211 may determine a calibration adjustment based on the centroid 262. The calibration adjustment, among other data, may be included in the calibration data 231, which may be stored in database 123. The calibration data 231 may also include configuration settings for the use of the calibration adjustment.

The calibration adjustment may be a predetermined distance from the centroid 262. That is, the localization calibration module 211 may adjust the focal length used in the localization calculations by the predetermined distance. Example distances include 1 foot, 5 feet, 1 meter, 5 meters, 10 feet, or 10 meters. Other examples are possible. The predetermined distance is configurable and may be set by the user, the manufacturer, or the localization calibration module 211. The localization calibration module 211 may adjust a zoom setting for the camera 102. The zoom setting may be a factor for the zoom Example zoom settings include 1×, 1.5×, 2×, and other values.

The localization calibration module 211 may also select a direction that the calibration adjustment is applied to the focal length. The direction may be a heading detected by the mobile device 122 (e.g., magnetic sensor, compass, inertial measurement) and sent with the static position images 220. The direction may be an average heading across multiple static position images 220. The direction may be the opposite (e.g., 180-degree rotation) of the heading detected by the mobile device or averaged across multiple static position images 220.

The localization calibration module 211 may determine the calibration adjustment based on a variance in the static position images 220. For example, the localization calibration module 211 may calculate the centroid 262 across multiple static position images 220 and the variance as the sum of the squared distances of each of the position points 261 to the centroid 272. Optionally, the variance may be the sum of the squared distances of each of the position points 261 to the centroid 272 divided by a quantity of the position points 261. The calibration adjustment may be proportional to the variance such that larger variances results in larger calibration adjustments to the focal length. The localization calibration module 211 may calculate the calibration adjustment based on a scale factor multiplied by the variance. The scale factor may be selected by the user or predetermined.

The localization calibration module 211 may perform an iterative process after the calibration adjustment is applied. After the first correction (calibration adjustment) is applied, the same images, or another set of static position images 220, are used to perform the localization process again. The localization calibration module 211 repeats the calculation of the calibration adjustment after the first correction has been made to determine a second correction. In some instances, the subsequent calibration adjustment has increased (i.e., the second correction is greater than the first correction). When this happens, the correction has gone in the wrong direction. In response, the localization calibration module 211 may reverse the first correction and apply the first calibration adjustment in the opposite direction. In some instances, the subsequent correction has decreased (i.e., the second correction is less than the first correction). When this happens, the correction has improved the localization process and is maintained.

When the correction has improved the localization process, the localization calibration module 211 may determine whether to repeat another iteration of calibration adjustment. One way to decide whether another iteration should be performed is to compare the subsequent calibration adjustment to a threshold. Another way is to compare the variance to a threshold. Another way is to perform a set number of iterations (e.g., 3 or 5) and then stop. When a third or subsequent iteration is performed, the localization calibration module 211 repeats the calculation of the calibration adjustment after the second correction has been made to determine a third correction or subsequent correction. The localization calibration module 211 determines whether the calibration adjustment has improved the localization process based on variance.

When the calibration adjustment ends, the localization calibration module 211 begins the localization process again using the adjusted values for the focal length for images from the mobile device 122, which may be images collected after the static position images 220, and provides a location for the mobile device 122 based on the correction.

Figure 9:
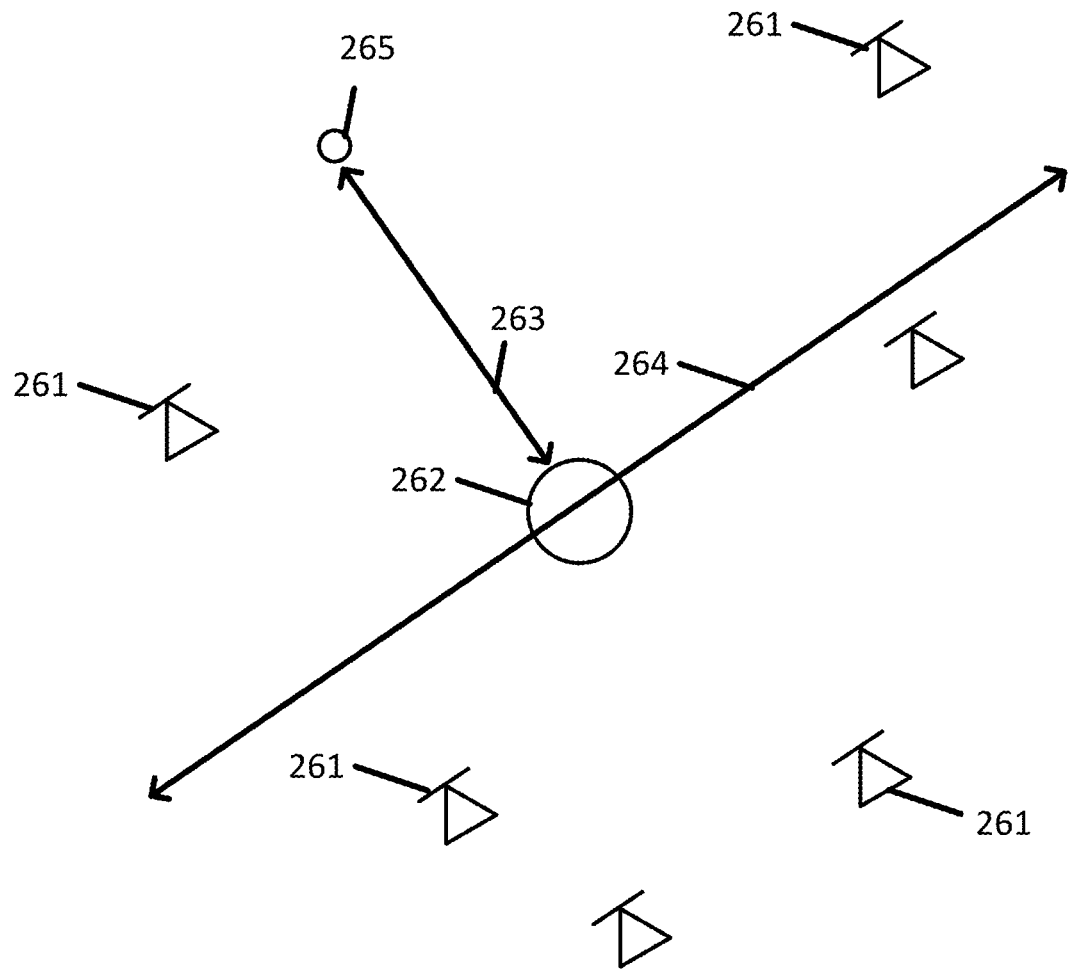
FIG. 9 illustrates another example calculation for calibration in the localization system or camera for use therein.

FIG. 9 illustrates another example calculation for calibration in the localization system or camera for use therein. In this example, the centroid 262 may be calculated from the position points 261 in any of the manners above. For example, the centroid 262 may have a first coordinate (e.g., latitude) that is the average of the corresponding coordinates across the position points 261 and a second coordinate (e.g., longitude) that is the average of the corresponding coordinates across the position points.

The localization calibration module 211 may calculate directional line 264 based on the centroid 262. First the localization calibration module 211 may determine a direction of the pose of the position points 261. The localization calibration module 211 may receive, for the static position images 220, pose values from the image-based positioned service. The direction of the pose may be determined from the position circuitry of the mobile device (e.g., compass, heading, or position data 203). The localization calibration module 211 generates the direction line 264 as a line passing through the centroid 262 that is perpendicular to the pose and in the plane of the position points 261.

The localization calibration module 211 may determine a direction for the calibration adjustment 263 based on the directional line 264. For example, the localization calibration module 211 may determine how many position points 261 are on each side of the directional line 264. The calibration adjustment 263 is selected to extend from the centroid 262 in the direction with the most position points 261. In the example shown in FIG. 9 there are four points below the directional line 264 and two points above the directional line 264. Thus, the calibration adjustment extends below the directional line 264 and the corrected centroid or camera position for that corresponds to updating the camera parameter (e.g., focal length) is below the direction line 264 at point 265.

Figure 10:
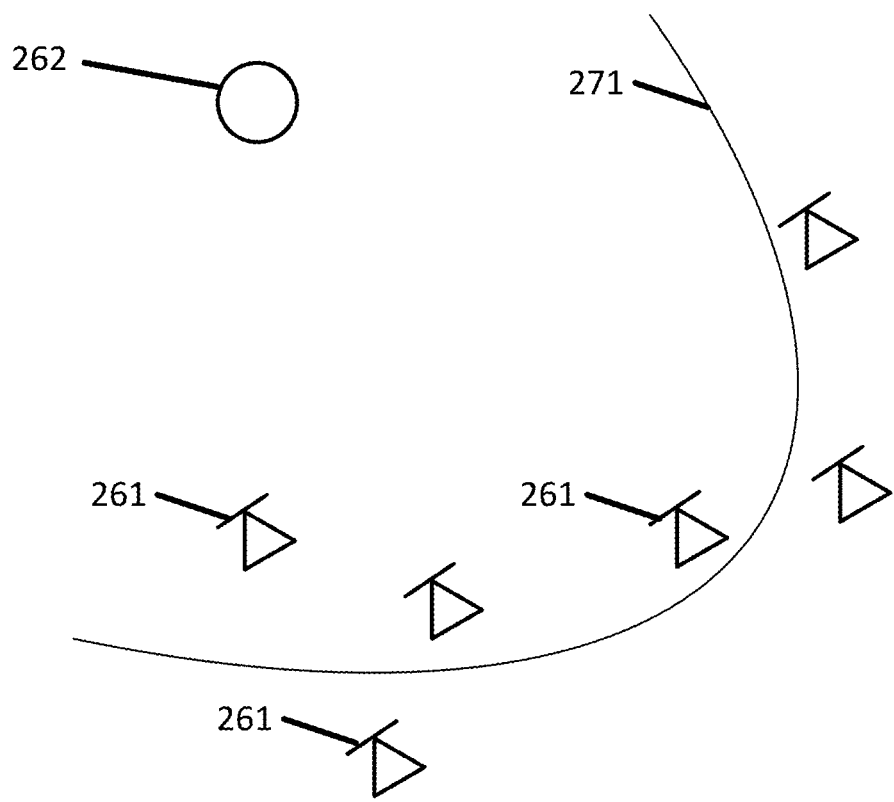
FIG. 10 illustrates another example calculation for calibration in the localization system or camera for use therein.

FIG. 10 illustrates another example calculation for calibration in the localization system or camera for use therein. In this example, the centroid 262 may be calculated from the position points 261 using a curve fitting technique. For example, the localization calibration module 211 may calculate a line 271 that is a trend line for the position points 261. The line 271 may be determined using a least squares technique, a regression technique, polynomial regression, polynomial interpolation, or another technique. The line 271 may be a curve having a constant radius of curvature. The localization calibration module 211 may calculate the radius of curvature and calculate the centroid 262 as the center of the radius of curvature. In other words, the localization calibration module 211 may calculate the calibration adjustment as the radius of curvature of line 271. In addition, the direction of the calibration adjustment is defined based on the line 271 such that the adjustment is made to the inside or concave side of the line 271.

Figure 11:
FIG. 11 illustrates an example illustration of the compensation for the error of FIG. 6.

FIG. 11 illustrates an example illustration of the compensation for the error of FIG. 6 using any of the examples described herein for the calibration adjustment. FIG. 11 illustrates a second or subsequent iteration of localization after the calibration adjustment has been applied to correct the focal length or zoom level associated with the images collected by the mobile device 122. In most instance in FIG. 11, the estimated position 243 determined by the localization process is closer to the actual position 241 (optionally verified by high resolution GNSS or in-person) than in the uncalibrated example of FIG. 6.

In one specific example, associated errors in FIG. 6 are higher using the automatically determined focal length of 4.30 mm than the calibration adjusted focal length of 4.43 mm focal length, as shown in FIG. 11. In particular, the VPS position is consistently misplaced at about 1.5 m in front of the GNSS position, in the direction of camera heading, as shown by lines 242 in FIG. 6. Regardless of which way the camera points, the position error is in that direction. This is particularly noticeable in the upper right corner of FIGS. 6 and 11, where the pedestrian plants their feet, and pans the phone across the scene. In the left figure, we see that using the incorrect focal length causes the VPS estimate to form an erroneous arc as the camera is panned, while the GNSS correctly retains the stationary position of the camera. Because the reported focal length is erroneously small, the VPS system believes that the image is more zoomed-out than it truly is. VPS thus mistakes the zoomed-in image as being taken a few steps in front of the user's true position.

Figure 12:
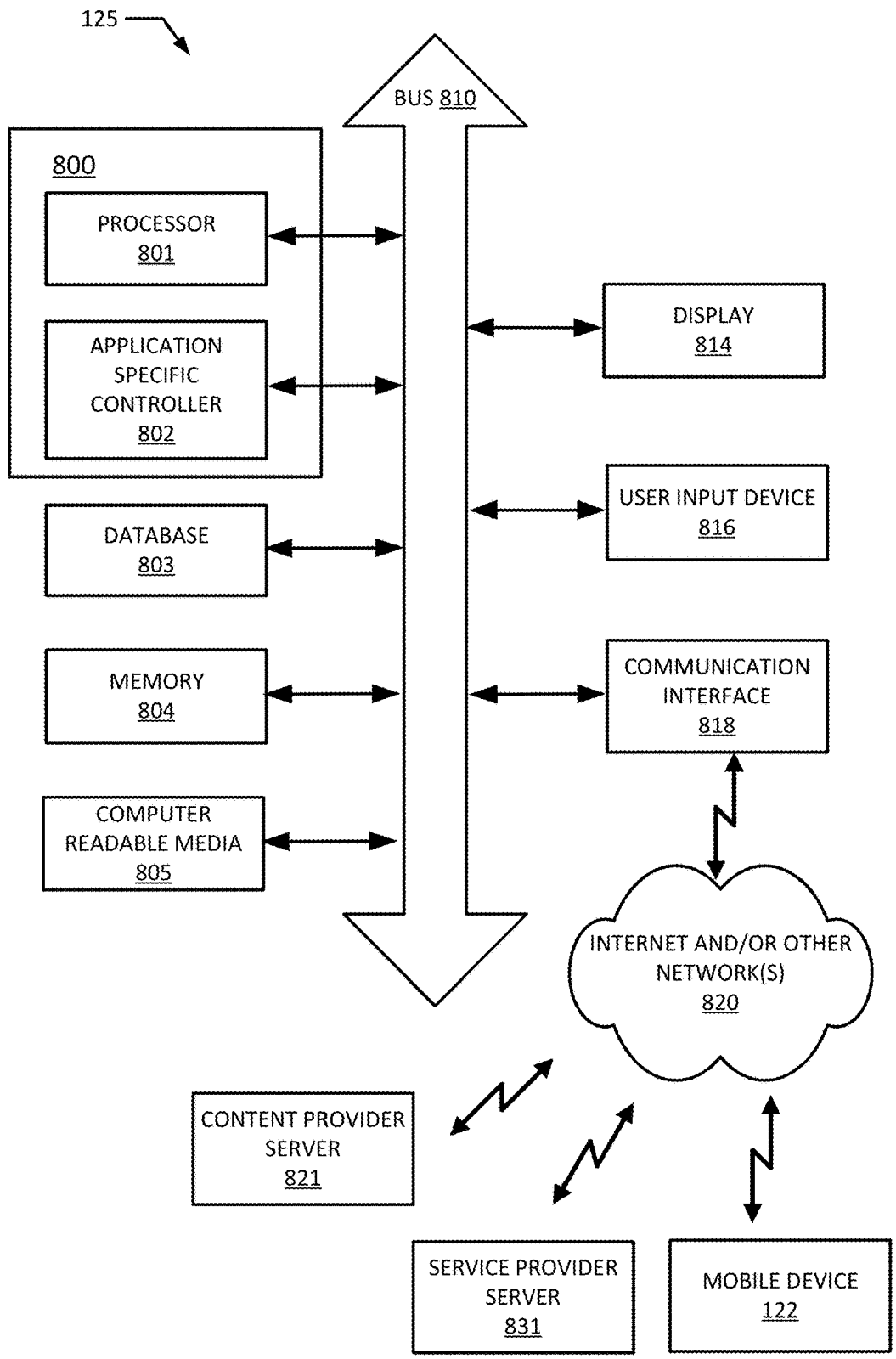
FIG. 12 illustrates an example server for the system of FIG. 2.

FIG. 12 illustrates an example server 125 for the system of FIG. 2. The server 125 may include a bus 810 that facilitates communication between a controller (e.g., the localization controller 120) that may be implemented by a processor 801 and/or an application specific controller 802, which may be referred to individually or collectively as controller 800, and one or more other components including a database 803, a memory 804, a computer readable medium 805, a display 814 (displaying any of the data or calculations described herein), a user input device 816 (receiving any of the configurations or settings described herein), and a communication interface 818 connected to the internet and/or other networks 820. The contents of database 803 are described with respect to database 123. The server-side database 803 may be a master database that provides data in portions to the database 903 of the mobile device 122. Additional, different, or fewer components may be included.

The memory 804 and/or the computer readable medium 805 may include a set of instructions that can be executed to cause the server 125 to perform any one or more of the methods or computer-based functions disclosed herein. In a networked deployment, the system of FIG. 4 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

The server 125 may be in communication through the network 820 with a content provider server 821 and/or a service provider server 831. The server 125 may provide the point cloud to the content provider server 821 and/or the service provider server 831. The content provider may include device manufacturers that provide location-based services associated with different locations POIs that users may access. The service provider server 831 may provide a cloud service for one or more aspect of the localization controller 120.

Figure 13:
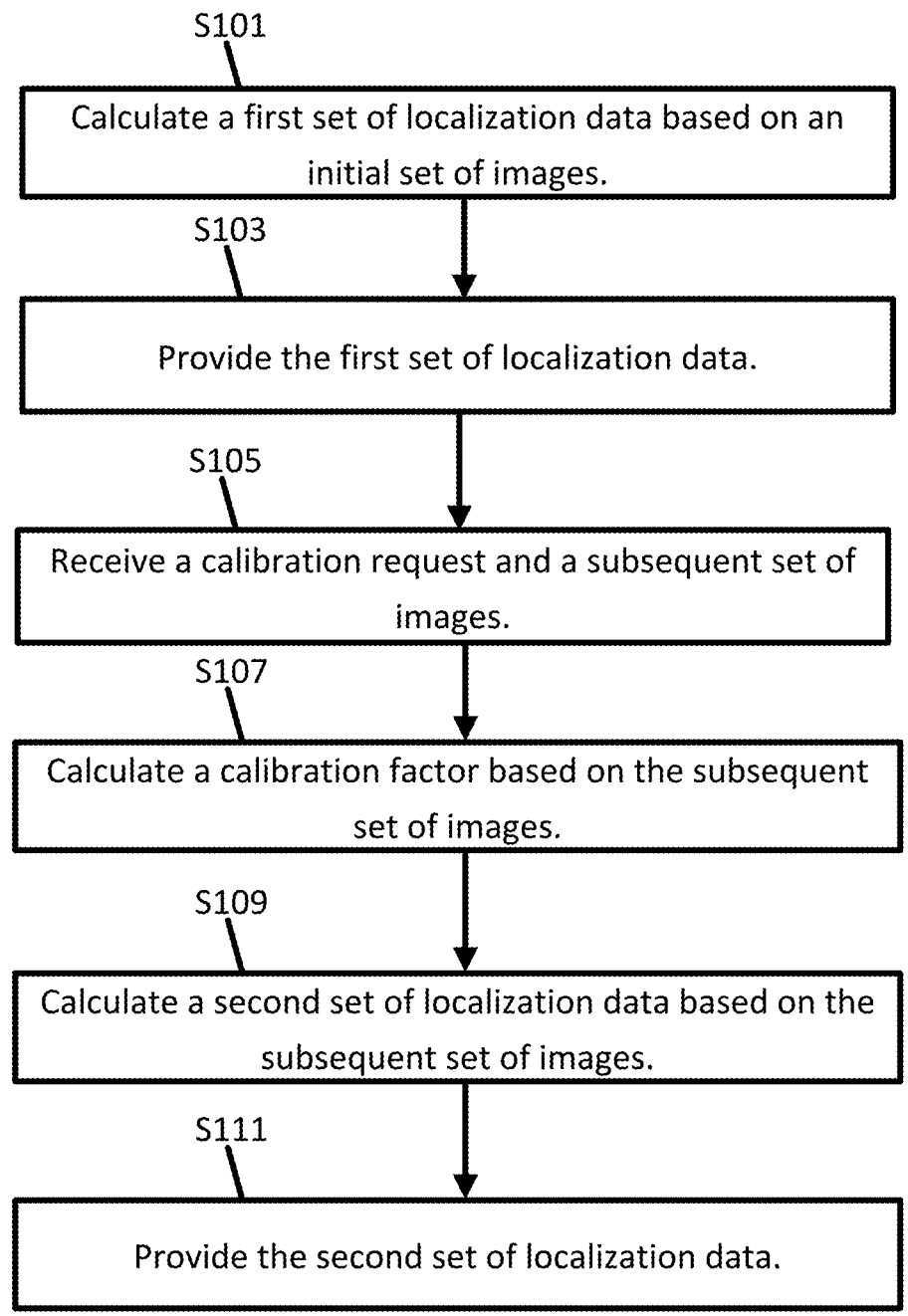
FIG. 13 illustrates an example flow chart for the server of FIG. 12.

FIG. 13 illustrates an example flow chart for the server 125 of FIG. 12. Portions of this process may be performed by another device such as mobile device 122, the content provider server 821 and/or the service provider server 831. Additional, different, or fewer acts may be provided.

At act S101, the controller 800 calculates a first set of localization data based on an initial set of images received from a mobile device. The initial set of images may be compared to a point cloud and/or each other in order to correlate the image plane of one or more of the images to the three-dimensional space described by the point cloud. The comparison is made based on one or more camera parameters that relate to the relative size and/or angle of one or more objects in the image and in the point cloud. From this correlation, a camera position from which the image was taken is determined. A single camera position of one of the may be considered the set of localization data or the set of localization data may include multiple camera positions, each corresponding to one of the initial set of images.

The localization calculation may include a variety of image processing techniques. A feature extractor may be configured to analyze the images. The initial images may also be associated with one or more image descriptors based on an image processing algorithm. The image descriptors may be identified or determined by the feature extraction module of the localization controller. The image descriptors may be visual descriptors including one or more values that encode the photographed appearance of that point in the image. The image descriptors are quantitative characterization of the image that may be different from the image itself. The image descriptors may include the results of an analysis of the image. In one example, a window or subset of each image is analyzed to determine a numerical value for the image descriptor. The window may be iteratively slid across the image according to a step size in order to analyze the image. The image descriptor may be a binary value that indicates whether or not the image data in the window matches a particular template or set of templates. For example, in feature detection, the image descriptor may indicate whether a particular feature is found in the window. In another example, the numerical value, or combination of numerical values for the image descriptor may describe what type of feature is included in the window. Example features may include edges, surfaces, foreground features, background features or other high-level indicators. Edge detection identifies changes in brightness, which corresponds to discontinuities in depth, materials, or surfaces in the image. Object recognition identifies an object in an image using a set of templates for possible objects. The template accounts for variations in the same object based on lighting, viewing direction, and/or size.

In one example, the image descriptors could be based on scale-invariant feature transform (SIFT). SIFT may perform a specific type of feature extraction that identifies feature vectors in the images and compares pairs of feature vectors. The feature vectors may be compared based on direction and length. The feature vectors may be compared based on the distance between pairs of vectors. The feature vectors may be organized statistically, such as in a histogram. The statistical organization may sort the image descriptors according to edge direction, a pixel gradient across the image window, or another image characteristic. As described in more detail below, the image descriptors are adaptable into a spatial relationship based on positional information associated with the initial images. The positional information may include position coordinates and/or heading values.

At act S103, the controller 800, or the communication interface 818, provides the first set of localization data to the mobile device 122. The set of localization data may be analyzed by the mobile device 122. In one example, the set of localization data is a single camera position and the mobile device 122 compares the position to another source of position data (e.g., GNSS). When the set of localization data is multiple camera positions, the mobile device 122 may determine an error by comparing the camera positions to each other. For example, two images taken only a few microseconds apart cannot be taken more than a meter apart. Also, when the set of localization data is multiple camera positions, the mobile device 122 may determine an error by comparing multiple camera positions to the other source of position data.

At act S105, the controller 800, or the communication interface 818, receives a calibration request and a subsequent set of images from the mobile device 122. In some examples, the calibration request may be received at user input device 816. In response to determining the error, the mobile device 122 may request calibration. In addition, in response to determining the error, the mobile device 122 may instruct the user to collect the subsequent set of images. For example, the mobile device 122 may request that a user remain stationary in a position and collect multiple images at various angles from the stationary position.

At act S107, the controller 800 calculates a calibration factor based on the subsequent set of images. The calibration factor is based on a variance of the first set of localization data or a line fit to the first set of localization data. The calibration factor may be based on a magnitude of variance found in the first set of localization data. The calibration factor may be based on a radius of curvature of the line fit to the set of localization data. The calibration factor may be based on a clustering of the set of localization data. Tighter clusters may be assigned lower calibration factors and larger clusters may be assigned larger calibration factors.

At act S109, the controller 800 calculates a second set of localization data based on the subsequent set of images (static position images) received from the mobile device 122 and the calibration factor. The subsequent set of images may be compared to a point cloud and/or each other in order to correlate the image plane of one or more of the images to the three-dimensional space described by the point cloud, which may be the same point cloud as in act S101. The comparison is made based on one or more camera parameters updated by the calibration factor that relate to the relative size and/or angle of one or more objects in the image and in the point cloud. From this correlation, a camera position from which the image was taken is determined. A single camera position of one of the may be considered the second set of localization data or the set of localization data may include multiple camera positions, each corresponding to one of the subsequent set of images.

At act S111, the controller 800, or the communication interface 818, provides the second set of localization data to the mobile device 122. As described in more detail below, the mobile device 122 may provided a variety of location-based services using the second set of localization data. The mobile device 122 may provided the current position to the user in a mapping application or a navigation application. The mobile device 122 may be associated with a vehicle and providing driving assistance or automated driving features.

The initial images and the subsequent images may be all of the images geocoded with locations within the geographic area. The images may be all of the images stored in memory 804 or computer readable media 805. Alternatively, the controller 800 may select particular images by comparing the geocodes or other locations data indexed along with the images.

Figure 14:
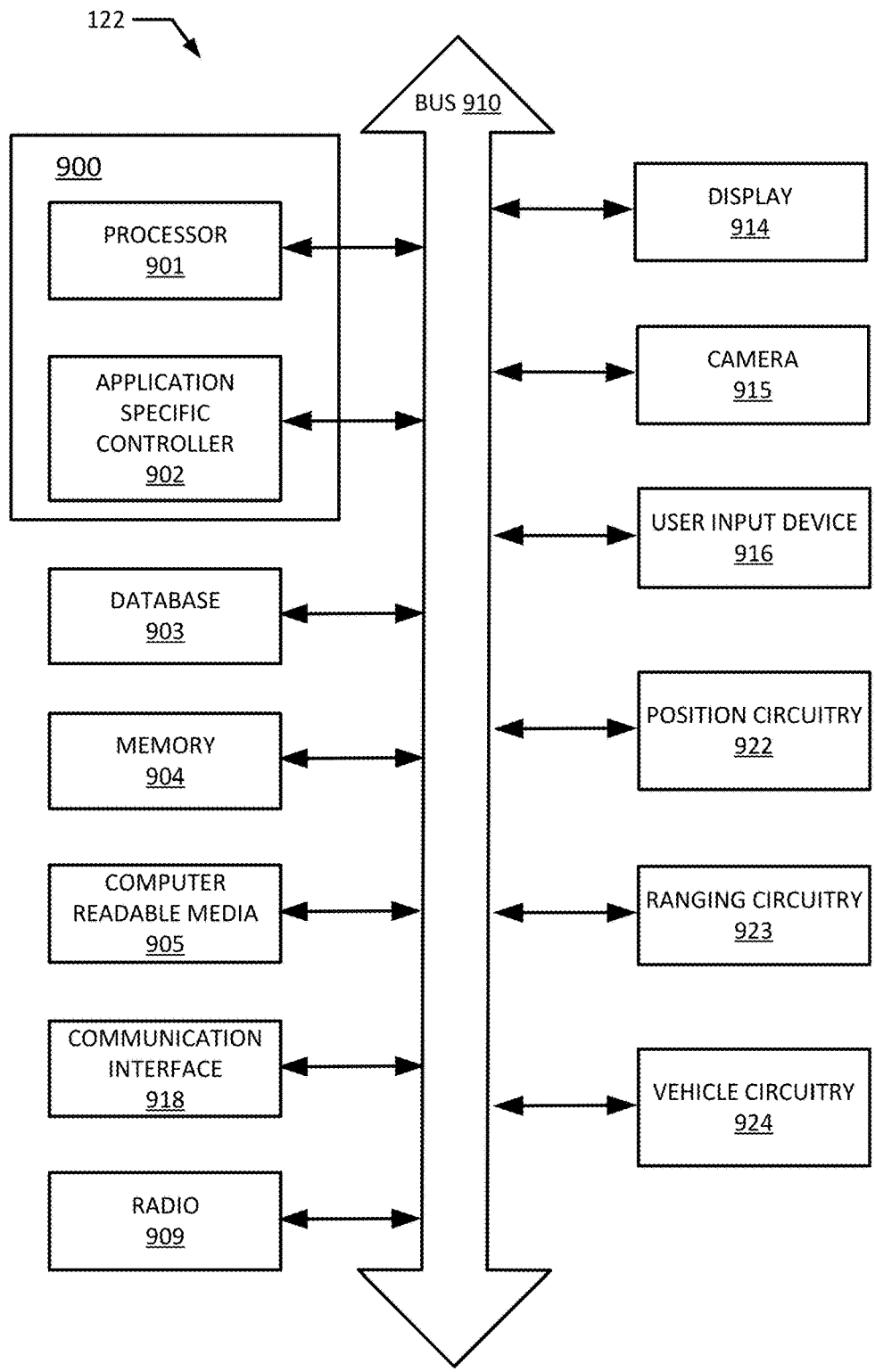
FIG. 14 illustrates an example mobile device for the system of FIG. 2.
Figure 15:
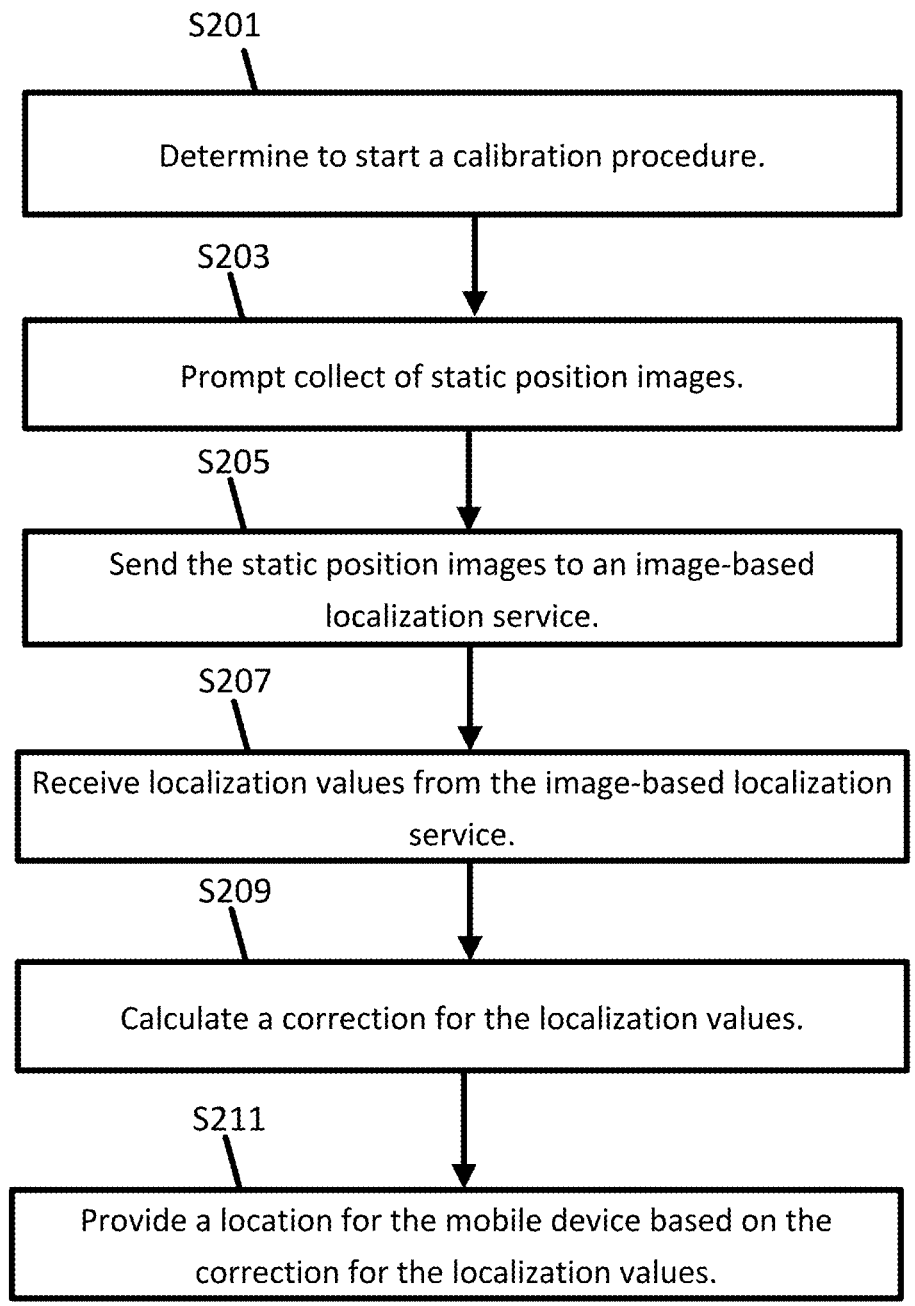
FIG. 15 illustrates an example flow chart for the mobile device of FIG. 14.

FIG. 14 illustrates an example mobile device 122 for the system of FIG. 1. The mobile device 122 may include a bus 910 that facilitates communication between a controller (e.g., the localization controller 120) that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to database 123. The device-side database 903 may be a user database that receives data in portions from the database 903 of the mobile device 122. The communication interface 918 connected to the internet and/or other networks (e.g., network 820 shown in FIG. 16). The vehicle circuitry 924 may include any of the circuitry and/or devices described with respect to FIG. 8. Additional, different, or fewer components may be included.

Portions of this process may be performed by another device such as the server 125, the content provider server 821 and/or the service provider server 831. Additional, different, or fewer acts may be included.

At act S201, the controller 900 may collect image data and supporting information. The image data may be collected by camera 915 as still images or video images. The supporting information may include position information determined by the position circuitry 922 or the ranging circuitry 923. The supporting information may include time data recorded in connection with the position information. The controller 900 may analyze the image data with respect to the supporting information to determine whether to run a calibration procedure.

At act S203, the controller 900 starts the calibration procedure by prompting the mobile device 122 for a collection of static position images for an image-based localization service. The mobile device 122, via display 914, which may be integrated with the user input device 916, may provide instructions for the collection of static position images. A textual, graphical, or audible instruction may be provided for the user to maintain a stationary position and take multiple images at two or more headings. The mobile device 122 may monitor the collection of the images through a magnetic sensor or compass. The mobile device 122 may monitor that the mobile device 122 does not change position by monitoring data collected by the position circuitry 922 and/or the ranging circuitry 923. The change in position may also be tracked by using an inertial motion sensor such as an accelerometer or a gyroscope. The mobile device 122 may compare positions associated with the collection of the static position images and delete or withdraw any images that are taken from different positions (e.g., effectively the mobile device 122 may compare subsequent positions to a distance threshold). The mobile device 122 may repeat act S203, or prompt the user again, to collect a new set of static position images.

At act S205, the controller 900 sends static position images to the image-based localization service. As described previously, the image-based localization services calculates the estimated position of the mobile device 122 by comparing the static position images individually or in subset to a point cloud. At act S207, the controller 900 receives, for the static position images, localization values from the image-based localization service.

At act S209, the controller 900 calculates a correction for the localization values. The correction may be based on a variance found in the localization values. Because the static position images should have been collected from the same location, and difference or variance in localization values is indicative of error. Other techniques may be used to determine the error as described herein. The correction may be an adjustment value that the mobile device 122 can directly make to the localization values and subsequent localization values received from the image-based localization service. At act S211, the controller 900 provides a location for the mobile device 122 based on the correction for the plurality of localization values. The location may be applied to any of the location-based applications described herein, which may provide data to the display 914 or memory 904 based on the location of the mobile device. The display 914 may present a map including the location of the mobile device 122. Further examples, are provided below.

Figure 16:
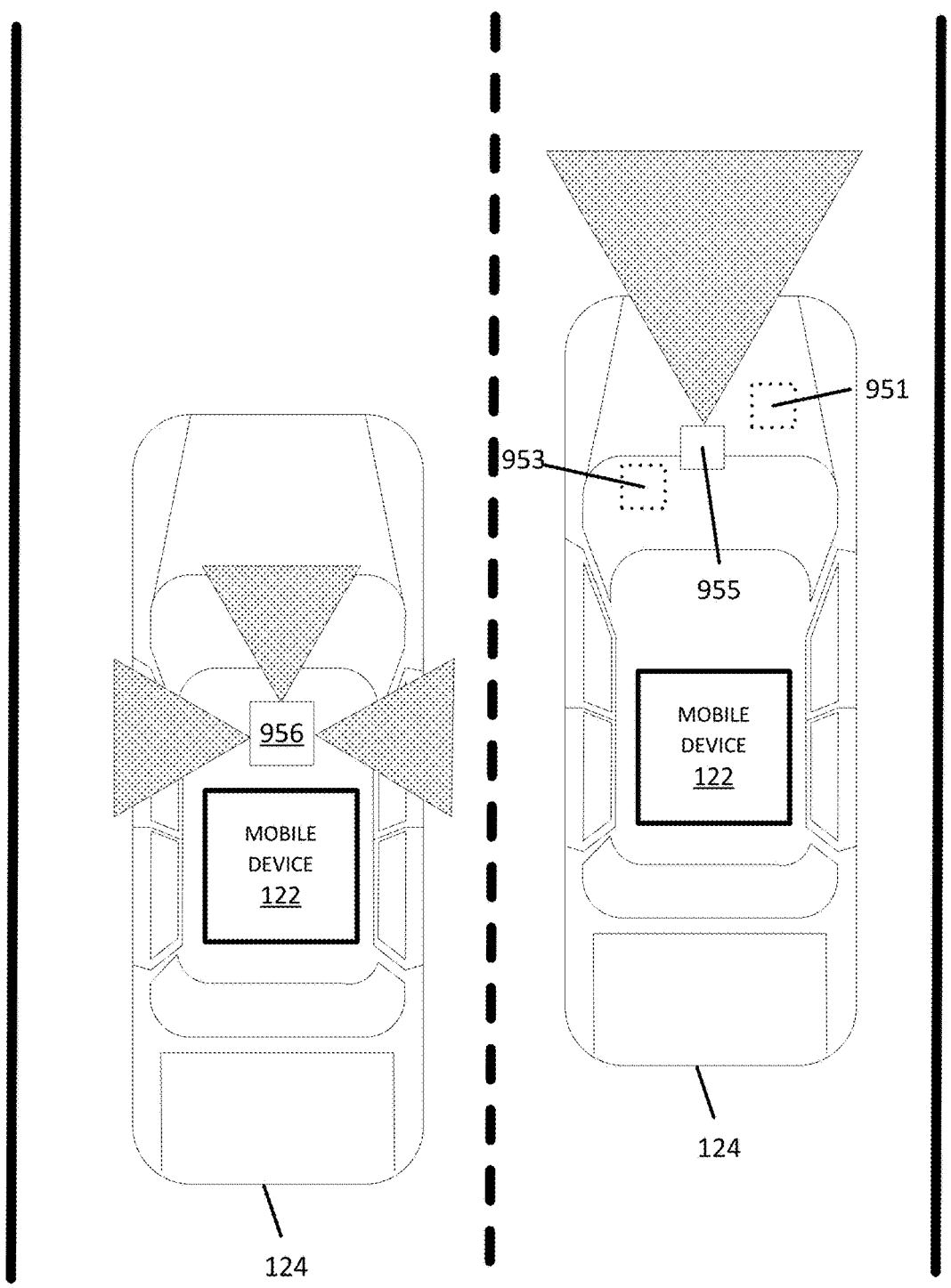
FIG. 16 illustrates exemplary vehicles for the system of FIG. 2.

FIG. 16 illustrates an exemplary vehicle 124 associated with the system of FIG. 1 for providing location-based services or application using the point clouds described herein as well as collecting data for such services or applications and/or the generation of the point clouds described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a LIDAR device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the calibrated location from the image-based localization service and other geographic data received from geographic database 123 and the server 125 to generate driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the calibrated location from the image-based localization service and other geographic data received from geographic database 123 and the server 125 to generate driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to the calibrated location from the image-based localization service and other geographic data received from geographic database 123 and the server 125 to generate driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the calibrated location from the image-based localization service and other geographic data received from geographic database 123 and the server 125 and driving commands or navigation commands.

The controller 900 may communicate with a vehicle ECU which operates one or more driving mechanisms (e.g., accelerator, brakes, steering device). Alternatively, the mobile device 122 may be the vehicle ECU, which operates the one or more driving mechanisms directly.

The controller 800 or 900 may include a routing module including an application specific module or processor that calculates routing between an origin and destination. The routing module is an example means for generating a route in response to the anonymized data to the destination. The routing command may be a driving instruction (e.g., turn left, go straight), which may be presented to a driver or passenger, or sent to an assisted driving system. The display 914 is an example means for displaying the routing command. The mobile device 122 may generate a routing instruction based on the anonymized data.

The routing instructions may be provided by display 914. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 flor through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The geographic database 123 may contain at least one road segment database record 304 (also referred to as "entity" or "entry") for each road segment in a particular geographic region. The geographic database 123 may also include a node database record (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The radio 909 may be configured to radio frequency communication (e.g., generate, transit, and receive radio signals) for any of the wireless networks described herein including cellular networks, the family of protocols known as WiFi or IEEE 802.11, the family of protocols known as Bluetooth, or another protocol.

The memory 804 and/or memory 904 may be a volatile memory or a non-volatile memory. The memory 804 and/or memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 818 and/or communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The ranging circuitry 923 may include a LIDAR system, a RADAR system, a structured light camera system, SONAR, or any device configured to detect the range or distance to objects from the mobile device 122.

The positioning circuitry 922 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network devices.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for localization of a mobile device, the method comprising:
   determining an error for an initial set of images collected for an image-based localization service;
   prompting the mobile device for a collection of static position images in response to the error for the initial set of images collected for the image-based localization service;
   sending the static position images to the image-based localization service;
   receiving, for the static position images, a plurality of localization values from the image-based localization service;
   calculating a correction for the plurality of localization values; and
   providing a location for the mobile device based on the correction for the plurality of localization values.

2. The method of claim 1, further comprising:
   receiving at least two positions for the mobile device in initial localization data; and
   comparing the at least two positions for the mobile device, wherein prompting the mobile device is based on the comparison.

3. The method of claim 2, further comprising:
   calculating a difference between the at least two positions for the mobile device; and
   comparing the difference between the at least two positions to a threshold, wherein the mobile device is prompted for the collection of static position images based on the comparison.

4. The method of claim 1, wherein prompting the mobile device for the collection of static position images comprises:
   providing an instruction to remain stationary; and
   providing an instruction to pan the mobile device for the collection of static position images.

5. The method of claim 1, wherein prompting the mobile device for the collection of static position images comprises:
   providing a leveling indicator for the collection of the static position images.

6. The method of claim 1, wherein the image-based localization service uses a point cloud for the localization of the mobile device.

7. The method of claim 1, further comprising:
   receiving, for the static position images, a plurality of pose values from the image-based localization service, wherein the correction for the plurality of localization values is based on the plurality of pose values.

8. The method of claim 1, further comprising:
   receiving, for the static position images, a plurality of pose values from the image-based localization service; and
   calculating a variation in the plurality of pose values, wherein the correction for the plurality of localization values is based on the variation of the plurality of pose values.

9. The method of claim 1, further comprising:
   fitting a line to the plurality of localization values from the image-based localization service, wherein the correction for the plurality of localization values is based on the line.

10. The method of claim 1, further comprising:
    calculating a radius for the plurality of localization values from the image-based localization service, wherein the correction for the plurality of localization values is based on the radius.

11. The method of claim 1, wherein the correction for the plurality of localization values is a zoom value associated with the static position images.

12. The method of claim 1, wherein the correction for the plurality of localization values is a focal length value for the image-based localization service.

13. The method of claim 1, wherein the mobile device is prompted for the collection of static position images based on a user input.

14. An apparatus for calibration of a localization technique, the apparatus comprising:
    a camera configured to collect an initial set of images for localization with a visual positioning service;
    a controller configured to identify an error in initial localization data received from the visual positioning service; and
    a user interface configured to prompt collection of static position images for the visual positioning service in response to the error,
    wherein the controller is configured to determine a correction for a plurality of localization values received from the visual positioning service based on the static position images.

15. The apparatus of claim 14, further comprising:
    position circuitry configured to collect position data associated with the initial set of images, wherein the error identified from a comparison of the initial localization data received from the visual positioning service with the position data.

16. The apparatus of claim 14, wherein the controller is configured to calculate a location for the apparatus based on the correction for the plurality of localization values.

17. The apparatus of claim 14, wherein a calibration factor for the static position images is determined based on a variance of the initial localization data for the static position images.

18. The apparatus of claim 14, wherein a calibration factor for the static position images is determined based on a curve fit to the initial localization data for the static position images.

19. A non-transitory computer readable medium including instructions that when executed are configured to perform:
    determining an error for an initial set of images collected for an image-based localization service;

prompting a mobile device for a collection of static position images in response to the error for the initial set of images collected for the image-based localization service;

sending the static position images to the image-based localization service;

receiving, for the static position images, a plurality of localization values from the image-based localization service;

calculating a correction for the plurality of localization values; and providing a location for the mobile device based on the correction for the plurality of localization values.

20. The non-transitory computer readable medium of claim 19, wherein prompting the mobile device for the collection of static position images comprises:

providing an instruction to remain stationary; and providing an instruction to pan the mobile device for the collection of static position images.

* * * * *